United States Patent [19] [11] Patent Number: 4,511,013
Miyakoshi et al. [45] Date of Patent: Apr. 16, 1985

[54] REAR SUSPENSION SYSTEM FOR MOTORCYCLES

[75] Inventors: Shinichi Miyakoshi; Kazuhiko Tsunoda, both of Saitama, Japan

[73] Assignee: Honda Giken Kogyo Kabushiki Kaisha, Tokyo, Japan

[21] Appl. No.: 400,935

[22] Filed: Jul. 22, 1982

[30] Foreign Application Priority Data

Jul. 23, 1981 [JP] Japan .................. 56-109981[U]

[51] Int. Cl.³ .......................................... B62K 25/20
[52] U.S. Cl. ................... 180/227; 188/303; 280/284
[58] Field of Search ............... 180/227; 280/284, 285, 280/287; 188/303

[56] References Cited

U.S. PATENT DOCUMENTS

| 3,907,332 | 9/1975 | Richardson | 280/285 |
| 4,058,181 | 11/1977 | Buell | 180/227 |
| 4,076,271 | 2/1978 | Doncque | 280/284 |
| 4,322,088 | 3/1982 | Miyakoshi et al. | 280/284 |
| 4,356,877 | 11/1982 | Kamiya | 180/227 |
| 4,360,214 | 11/1982 | Isono | 280/284 |
| 4,363,375 | 12/1982 | Kamiya | 180/227 |
| 4,378,857 | 4/1983 | Andersson | 180/227 |

FOREIGN PATENT DOCUMENTS

| 23893 | 2/1981 | European Pat. Off. | 280/284 |
| 2830831 | 1/1980 | Fed. Rep. of Germany | 180/227 |
| 1042 | 2/1917 | United Kingdom | 280/284 |
| 706222 | 3/1954 | United Kingdom | 280/284 |
| 2067143 | 7/1981 | United Kingdom | 280/284 |

Primary Examiner—Joseph F. Peters, Jr.
Assistant Examiner—Mitchell J. Hill
Attorney, Agent, or Firm—Irving M. Weiner; Pamela S. Burt

[57] ABSTRACT

A rear suspension system mounted on a motorcycle having a body frame, a rear wheel and a rear wheel supporting member which is pivotable together with a vertical movement of the rear wheel. The system comprises a pivotal damper disposed on the body frame and having an operating shaft which is integrally pivotable with a link member interlocked with the rear wheel supporting member, and a coil spring tensioned between the body frame and the link member in a position different from the position of the pivotal damper. With such arrangement, there is attained increased design freedom with respect to changing the capacity of the damper, reduction in size and weight of the coil spring, and increase in size and capacity of devices disposed in the vicinity of the coil spring.

11 Claims, 6 Drawing Figures

REAR SUSPENSION SYSTEM FOR MOTORCYCLES

BACKGROUND OF THE INVENTION

1. Field of the Invention

The present invention relates generally to a rear suspension system for motorcycles. More particularly, the invention relates to a rear suspension system for motorcycles comprising a pivotable-shaft actuated type damper and a coil spring.

2. Description of Relevant Art

A typical conventional rear suspension system for motorcycles is disposed between a relatively stationary rigid structure, for example, a vehicle body frame, and an element which is pivotably attached to the rigid structure and swingable together with vertical movement of a rear wheel, such as a rear fork. Such a system includes a shock absorber comprising an integral combination of a cylindrical damper disposed between the rear fork and an upper rear portion of the vehicle body and a coil spring fitted over the outer periphery of the damper, the shock absorber being provided so as to cushion a swinging motion of the rear fork induced by a vertical movement of the rear wheel in following undulations in the road surface, by virtue of the damping force of the cylindrical damper which is adapted to expand and contract and also by the biasing force of the coil spring.

Such a conventional shock absorber does not permit sufficient freedom of design with respect to the length of the damper, etc. For example, the amount of expansion and contraction of the cylindrical damper must be determined in accordance with the amount of pivotal movement of the rear fork. In such shock absorber, moreover, a pressure-resistant seal member is attached to a piston in the cylindrical damper to ensure a high-pressure compression by the piston of a hydraulic operating fluid, so as to generate a damping force by virtue of a throttling action of such fluid. However, a sliding resistance of such pressure-resistant seal member affects the damping characteristic of the damper when the damper expands or contracts. Further, although a coil spring is easy to manufacture and is advantageous with respect to cost, the diameter thereof is inevitably required to be large because it is fitted over the outer periphery of the cylindrical damper, thus resulting in not only an increase in the vehicle body width but also, in the event that devices such as an air cleaner, a battery and a fuel tank are disposed alongside the shock absorber, the sizes and capacities of such devices are restricted by their positional relationship to the coil spring.

The present invention effectively overcomes the foregoing problems attendant conventional rear suspension systems for motorcycles of the construction described hereinabove.

SUMMARY OF THE INVENTION

The present invention provides a rear suspension system to be mounted on a motorcycle having a relatively stationary rigid structure, a rear wheel, and an element which is pivotable with respect to the rigid structure together with vertical movement of the rear wheel. The suspension system comprises a pivotable-shaft actuated type damper fixedly mounted on the aforesaid rigid structure and having an operating shaft pivotable in interlocking cooperation with the aforesaid pivotable element, and a coil spring tensioned between the rigid structure and the pivotable element.

It is an object of the present invention to provide a rear suspension system for motorcycles which affords a high degree of design freedom with respect to changing the capacity thereof and which incorporates a damper constructed such that the sliding resistance of a pressure-resistant seal member is minimized.

It is another object of the present invention to provide a rear suspension system for motorcycles which on the one hand utilizes the advantages in manufacture and cost of a coil spring, and on the other hand permits a relatively free selection of the positions in which a damper and a coil spring are to be disposed.

It is a further object of the present invention to provide a rear suspension system for motorcycles which permits a relatively reduced diameter of a coil spring, thereby permitting increases in the size and capacity of devices disposed in the vicinity thereof.

The above and further objects, details and advantages of the present invention will become apparent from the following detailed description of preferred embodiments thereof, when read in conjunction with the accompanying drawings.

DETAILED DESCRIPTION OF PREFERRED EMBODIMENTS

Figure 1:
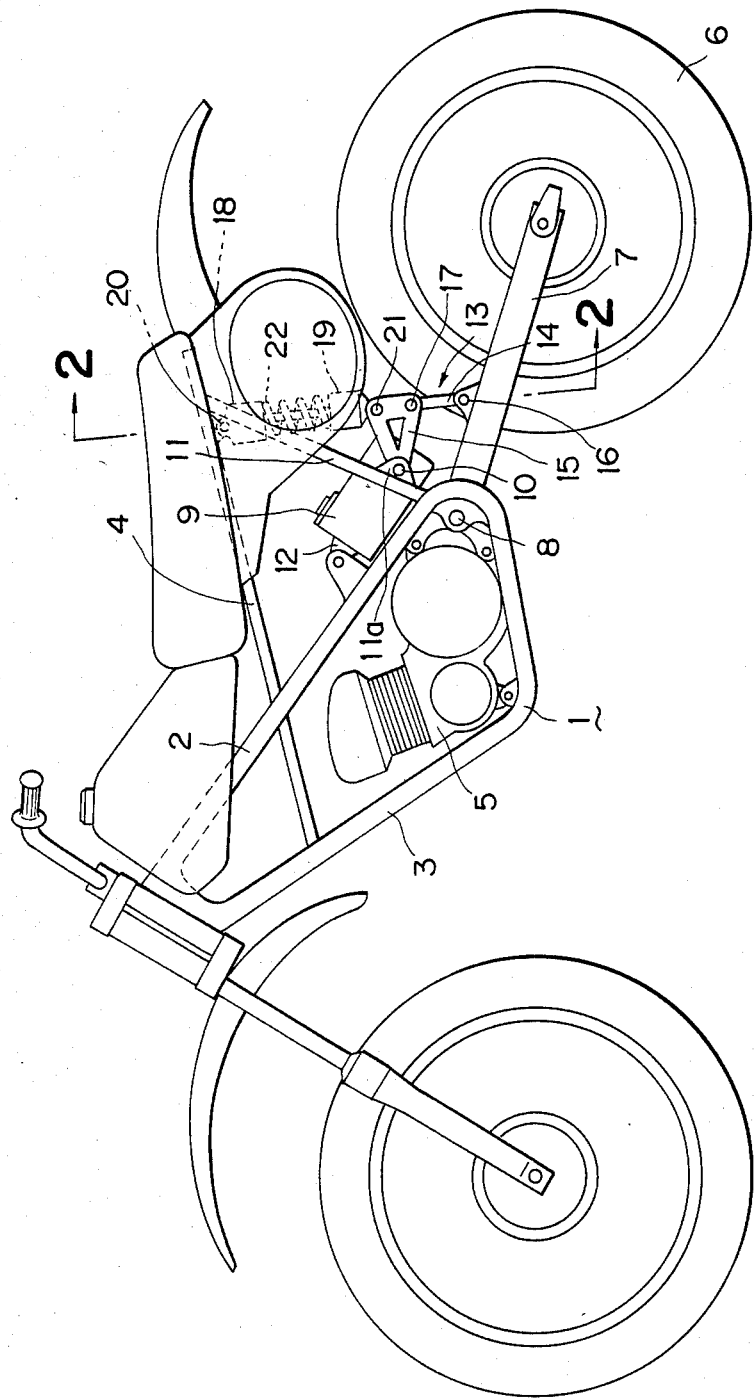
FIG. 1 is an overall side view of a motorcycle provided with a rear suspension system in accordance with a first embodiment of the present invention.

With reference to FIG. 1, there is shown a motorcycle provided with a rear suspension system according to a first embodiment of the invention. A vehicle body frame 1 comprises a relatively stationary rigid structure of the motorcycle, and includes a main frame 2, a down tube 3, a seat frame 4, etc., with an engine 5 being disposed within the vehicle frame 1. A rear wheel 6 is journalled to the rear end of a rear fork 7, and the front end of the rear fork 7 is attached to the vehicle body frame 1 through a pivot shaft 8 so as to be vertically pivotable, the rear fork 7 comprising a rear wheel supporting member adapted to pivot to permit the rear wheel 6 to move up and down in following undulations in the road surface.

A pivotable-shaft actuated type damper 9, which is disposed on the main frame 2, is provided with an anchor shaft adapted to create a pivotal reaction force corresponding to an amount of pivotal movement, i.e., a pivotable operating shaft 10. The shaft 10 is pivotably supported by a mounting bracket 11a which is fixed to a reinforcing frame 11, whereby the damper 9 is connected to the vehicle body frame 1. A boss portion 12 formed on the front of the damper 9 is connected to the main frame 2 so as to prevent the damper 9 from swivelling.

The rear fork 7 and the pivotable operating shaft 10 of the damper 9 are connected through a link mechanism 13. The link mechanism 13 comprises a rod 14 and a pivotable link member 15 which is substantially triangular in side elevation. The lower end of the rod 14 is pivotably connected to the rear fork 7 by means of a bolt 16, while the upper end of the rod 14 and the lower rear end of the pivotable member 15 are pivotably connected by means of a bolt 17. The front end of the pivotable member 15 is integrally connected to the pivotable operating shaft 10, with the shaft 10 serving as a pivot shaft for the pivotable member 15. As the pivotable member 15 pivots, the operating shaft 10 is pivoted integrally therewith to cause the damper 9 to produce a damping force, and in this sense the pivotable member 15 also serves as an actuating lever for the damper 9.

To an upper rear end portion of the seat frame 4 and the upper rear end of the pivotable member 15 are respectively secured vertically opposed cup-like spring shoe members 18 and 19 by means of bolts 20 and 21 so as to be longitudinally pivotable, with a coil spring 22 being disposed between the spring shoe members 18 and 19. In this manner, the coil spring 22 is tensioned between the vehicle body frame 1 and the pivotable member 15 which is adapted to pivot as the rear fork 7 pivots about the pivot shaft 8.

As shown in FIG. 1, the coil spring 22 is disposed in a position rearwardly of and different from the position of the damper 9.

Figure 2:
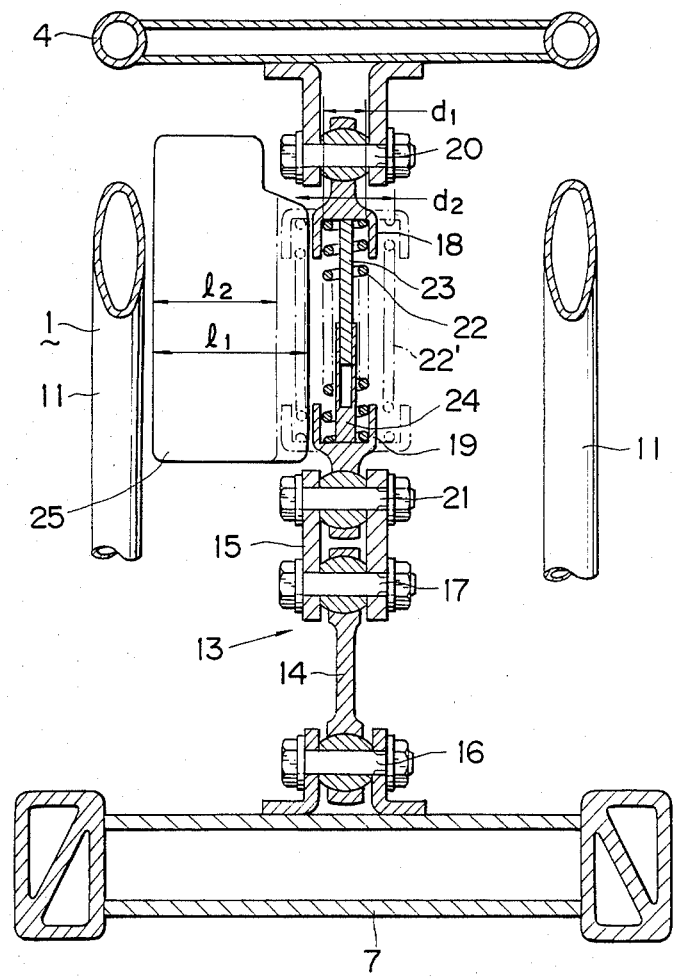
FIG. 2 is an enlarged rear view, with principal portions broken away, showing a coil spring employed in the rear suspension system of the motorcycle of FIG. 1, and devices disposed in the vicinity thereof.

Referring now to FIG. 2, there is shown the coil spring 22 and devices disposed in the vicinity thereof, the coil spring 22 being expanded and contracted by expansion rods 23 and 24 fixed to the spring shoe members 18 and 19, respectively, which arrangement prevents buckling of the coil spring 22.

In this embodiment, a single coil spring 22 is disposed centrally in the width direction of the vehicle body, and at a side thereof an air cleaner 25 is mounted to the vehicle body frame 1, for example, by being fixed to the reinforcing frame 11. The diameter $d_1$ of the coil spring 22 can be made smaller than the diameter $d_2$ of a conventional coil spring 22' which has heretofore had to be made large because of the necessity of it being fitted over the outer periphery of a cylindrical damper. Consequently, by an amount corresponding to the reduction in diameter of the coil spring 22, the width of the air cleaner 25 can be enlarged from $l_2$ to $l_1$, i.e., it is possible to attain an increase in capacity of the air cleaner 25 which contributes to improvement of the engine output. Such an improvement of design freedom in selecting a size, capacity, etc., which can be attained by the reduction in diameter of the coil spring 22, also applies to a battery and other devices disposed in the vicinity of the coil spring 22.

Figure 3:
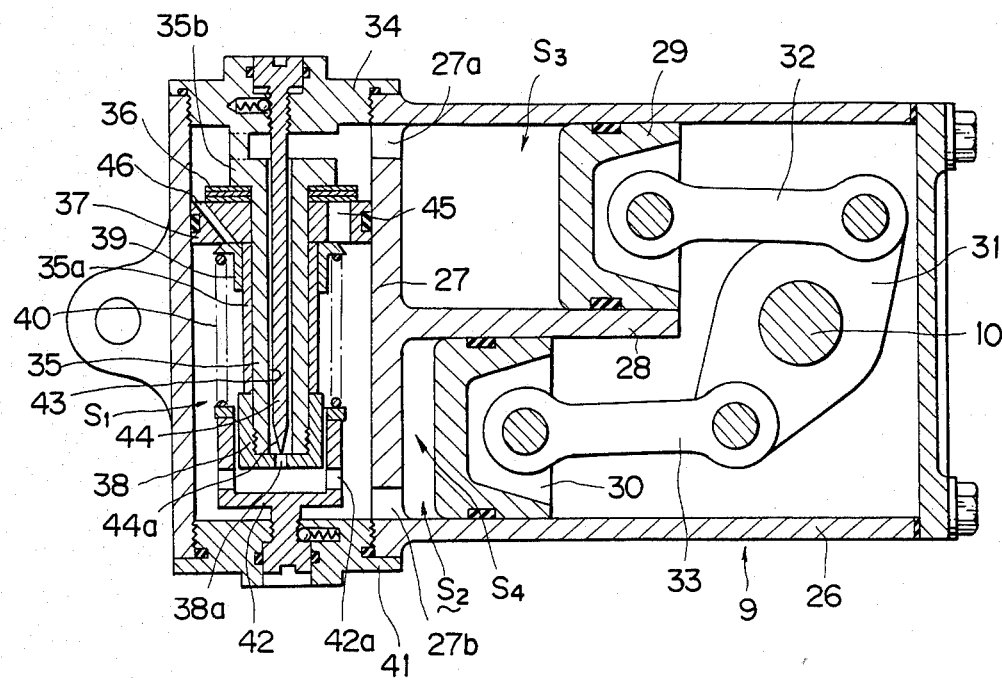
FIG. 3 is an enlarged longitudinal sectional view of the rear suspension system shown in FIG. 1.

Referring now to FIG. 3, there is shown the rear suspension system in longitudinal section, wherein the pivotable-shaft actuated type damper 9 has a damper case 26 filled with a hydraulic operating fluid. The interior of the case 26 is partitioned by a longitudinal wall 27 into a damping force generating chamber $S_1$ and a piston chamber $S_2$, which piston chamber $S_2$ is further partitioned by a transverse wall 28 into upper and lower chambers $S_3$ and $S_4$, the chamber $S_1$ communicating with the chambers $S_3$ and $S_4$ through holes 27a and 27b. Within the chambers $S_3$ and $S_4$ are slidably disposed pistons 29 and 30, respectively. The pistons 29 and 30 are connected to the pivotable operating shaft 10 through a piston arm 31 and connecting rods 32 and 33.

In the damping force generating chamber $S_1$ is inserted a guide tube 35 integral with a cover 34 provided on the case 26, and on the outer periphery of the guide tube 35 are fitted a plurality of plate valves 36 formed of a leaf spring material, a disk-like member 37 and a spacer 35a, with a cap 38 provided with an orifice 38a being threadedly engaged with the end of the guide tube 35 opposite cover 34, whereby the plate valves 36 and the disk-like member 37 are held and fixed between a base flange portion 35b of the guide tube 35 and the spacer 35a. On the outer periphery of the spacer 35a is slidably mounted a slide valve 39 to which is imparted a biasing force of a spring 40. On the surface of the case 26 at the side opposite to the cover 34 is provided a cover 41 to which is attached a spring shoe member 42 provided with a through hole 42a. More specifically, the spring shoe member 42 is fitted over the outer periphery of the cap 38 and is of a screw type which is threadedly engaged with the cover 41 for threaded rotation from the exterior. The guide tube 35 has an internal passage 43 into which is inserted a needle 44. The needle 44, which has a tapered tip end portion 44a facing the orifice 38a, is also of a screw type threadedly engaged with the cover 34 for threaded rotation from the exterior.

In the disk-like member 37 are formed orifices 45 and 46. An opening end of the orifice 45 on the chamber $S_3$ side is closed by the plate valves 36, while an opening end of the orifice 46 on the chamber $S_4$ side is closed by the slide valve 39.

The pivotable-shaft actuated type damper 9 may be of any suitable type, such as a piston type or vane type, provided it produces a damping force upon pivotal movement of the pivotable operation shaft.

The rear suspension system for motorcycles according to the first embodiment of the invention as described hereinabove operates in the following manner.

As the rear fork 7 pivots upwardly about the pivot shaft 8 in FIG. 1 to permit an upward movement of the rear wheel 6 in following undulations in the road surface, the pivotable member 15 pivots counterclockwise in FIG. 1 about the operating shaft 10, so that the coil spring 22 is compressed and its biasing force serves to cushion the upward movement of the rear wheel 6. Along with the counterclockwise pivotal movement of the pivotable member 15, the operating shaft 10 is also pivoted in the same direction whereby the piston 29 shown in FIG. 3 advances, i.e., moves to the left in FIG. 3, so that the hydraulic operating fluid in the chamber $S_3$ flows through the through hole 27a, internal passage 43, orifice 38a, through holes 42a and 27b and into the chamber $S_4$. In this case, because the hydraulic operating fluid passes through the orifice 38a, the opening area of which is narrowed by insertion of the tapered portion 44a of the needle 44, a damping force is generated by the throttling action of the orifice 38a and serves as a cushioning force for the upward movement of the rear wheel 6.

Because the needle 44 is of a screw type capable of being moved back and forth, the opening area and the degree of flow restriction of the orifice 38a can be adjusted.

If the upwardly moving speed of the rear wheel 6 is high, the oil pressure within the chamber $S_3$ increases, so that the slide valve 39 is retreated against the spring 40 by the oil pressure acting thereon through the orifice 46, whereby the orifice 46 is opened and the hydraulic operating fluid flows through both orifices 38a and 46, causing a damping force to be produced according to the speed of upward movement of the rear wheel 6. The magnitude of such oil pressure for moving back the slide valve 39 to open the orifice 46 is determined in accordance with the biasing force of the spring 40, and the magnitude of such biasing force can be adjusted by threadedly advancing or retreating the screw-type spring shoe member 42.

If the rear fork 7 pivots downwardly about the pivot shaft 8 to permit a downward movement of the rear wheel 6, the piston 30 advances, so that the hydraulic operating fluid within the chamber $S_4$ flows through the through holes 27b and 42a, orifice 38a, internal passage 43 and through hole 27a into the chamber $S_3$. Also, because the fluid passes through the orifice 38a, the opening area of which is narrowed by insertion of the tapered portion 44a of the needle 44, a damping force is produced in the orifice 38a. At a high downwardly moving speed of the rear wheel 6, the plate valves 36 are deformed by an increased oil pressure in the chambers $S_4$ and $S_1$, whereby the orifice 45 is opened and the hydraulic operating fluid flows through both orifices 38a and 45, thus causing a damping force to be produced according to the speed of downward movement of the rear wheel 6.

In the operation described hereinabove, because the damper 9 is adapted to generate a damping force upon pivotal movement of the operating shaft 10, it is not necessary to change length, etc. according to amounts of pivotal movement of the rear fork 7, as would be the case with a cylindrical damper. Further, because a pressure-resistant seal member may be attached to the bearing portion of the operating shaft 10, the sliding resistance of the seal member which affects the damping characteristic can be made much lower than that of a pressure-resistant seal member used in a cylindrical damper.

Figure 4:
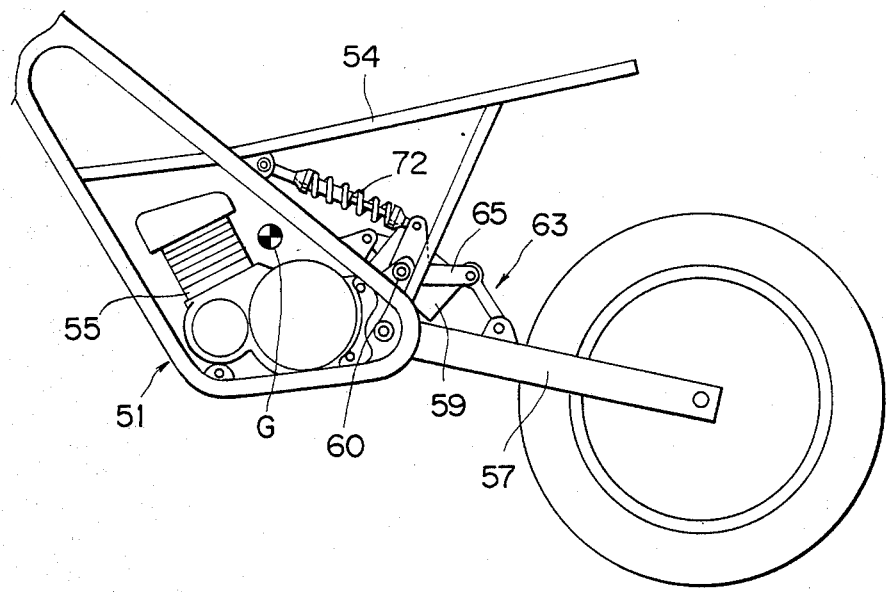
FIG. 4 is a side view showing principal portions of a motorcycle provided with a rear suspension system in accordance with a second embodiment of the present invention.

Referring now to FIG. 4, there is shown a rear suspension system according to a second embodiment of the present invention, wherein reference numeral 59 designates a pivotable-shaft actuated type damper and reference numeral 65 designates a pivotal bell crank link member which is substantially V-shaped in side elevation so as to define two arm portions. The pivotable member 65 serves as an actuating lever for the damper 59 and also as a movable member in a connecting link 63, which includes the member 65 and a rod, connected between a pivotable operating shaft 60 of the damper 59 and a rear fork 57. Between an upper front end of the pivotable member 65 and a seat frame portion 54 of a vehicle body frame 51 is tensioned a forwardly inclined coil spring 72, so that the coil spring 72 approaches the center of gravity G of the vehicle body, which exists near an engine 55, whereby the moment of inertia about such center of gravity G can be decreased.

Figure 5:
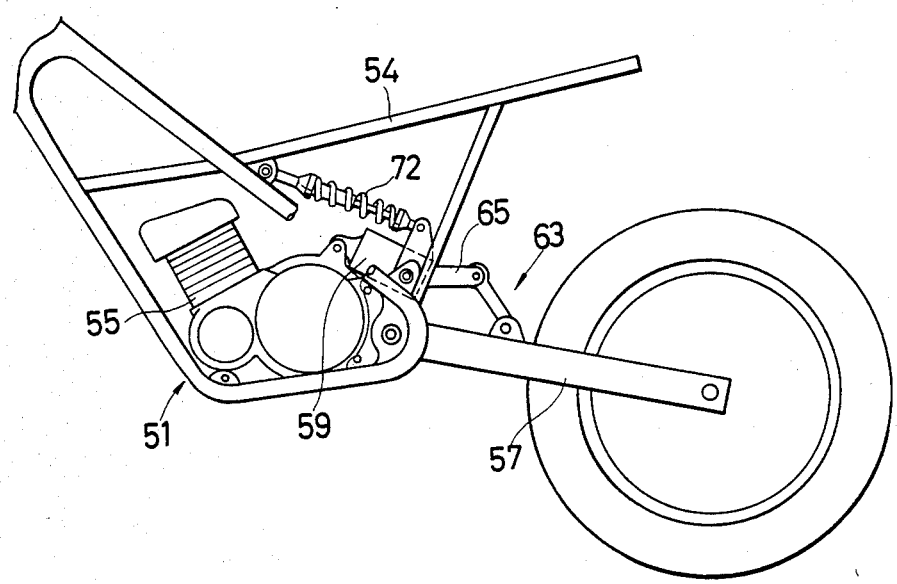
FIG. 5 is a side view, similar to FIG. 4, showing a modified mounting structure for a pivotable-shaft actuated type damper.
Figure 6:
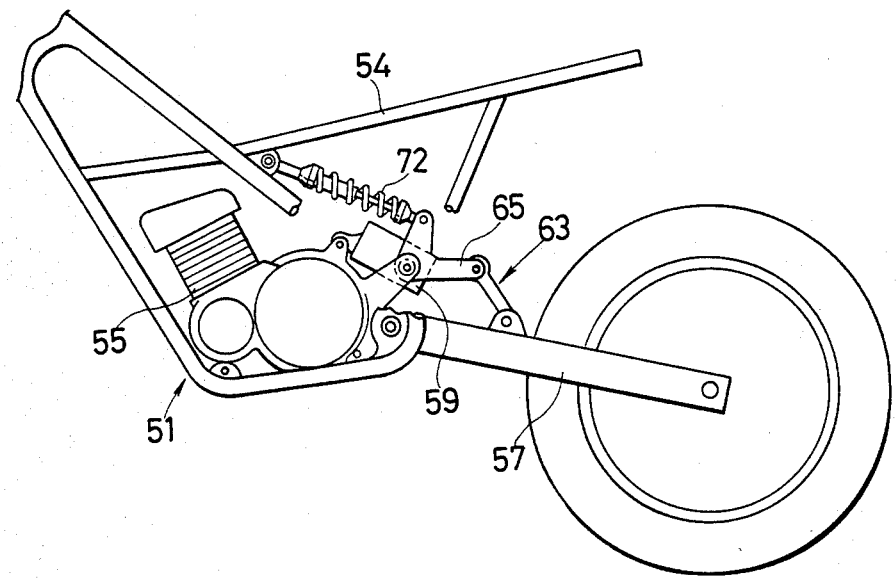
FIG. 6 is a side view, similar to FIG. 4, showing a further modified mounting structure for the pivotable-shaft actuated type damper.

In the above described first and second embodiments of the invention, casings of the engines 5 and 55 are fixed to the vehicle body frames 1 and 51, respectively, each of the casings constituting a relatively stationary rigid structure together with the vehicle body frame to which each is fixed, and therefore the dampers 9 and 59 may be mounted on such engine casings as shown in FIGS. 5 and 6 in connection with damper 59. Further, because the rear forks 7 and 57, like the pivotable members 15 and 65, are movable members adapted to pivot following vertical movements of the rear wheel, a coil spring may be tensioned between the rear fork and the vehicle body frame.

According to the present invention, as will be apparent from the foregoing description, because a pivotable-shaft actuated type damper is employed in place of a cylindrical damper, not only can the above-discussed drawbacks associated with a cylindrical damper be eliminated, but also a coil spring can be disposed in a position different from the position of the pivotable-shaft actuated type damper, whereby reduction in diameter of the coil spring is achieved. Such reduction in turn permits an increase in size and capacity of devices such as an air cleaner and a battery disposed adjacent the coil spring, i.e., an improvement in functioning of such devices is attainable.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a motorcycle having a relatively stationary rigid structure, a rear wheel and a pivotable element which is pivotable with respect to said rigid structure together with vertical movement of said rear wheel, a rear wheel suspension system comprising:
   a pivotable-shaft actuated type damper fixedly mounted on said rigid structure in stationary relation thereto, said damper being provided with actuating means therefor;
   said damper actuating means comprising a pivotable operating shaft, said damper operatively cooperating with said pivotable operating shaft so as to generate a damping force, while remaining stationary relative to said rigid structure, upon pivotal movement of said operating shaft about its own axis;
   a link mechanism operatively connected between said pivotable element and said damper, said link mechanism comprising a rod connected with a pivotable link member;
   said operating shaft of said damper being integrally connected with said link member so as to define a pivot shaft for said link member which pivots integrally therewith;
   a coil spring tensioned between said rigid structure and said link member such that said spring, said link member and said rod are operatively connected and arranged in series; and
   said damper and said coil spring being mounted separately and independently of each other.

2. A rear suspension system according to claim 1, wherein:
   said pivotable element comprises a rear wheel supporting member pivotably secured to said rigid structure for supporting said rear wheel, and said link member is operatively connected with said rear wheel supporting member via said rod.

3. A rear suspension system according to claim 2, wherein:

said link member has a substantially triangular shape in side elevation;

said rear wheel supporting member is operatively connected to a first corner portion of said link member, via said rod;

said operating shaft of said damper is integrally connected to a second corner portion of said link member; and said coil spring is pivotably secured at one end thereof to a third corner portion of said link member and is pivotably secured at the other end thereof to said rigid structure.

4. A rear suspension system according to claim 2, wherein:

said link member of said link mechanism comprises a bell crank member having two arm portions;

said rear wheel supporting member is operatively connected, via said rod, to one of said arm portions;

said operating shaft is integrally connected to an intersecting point of said arm portions; and said coil spring is pivotably secured at one end thereof to the other of said arm portions and is pivotably secured at the other end thereof to said rigid structure.

5. In a motorcycle having a relatively stationary rigid structure, a rear wheel and a pivotable element which is pivotable with respect to said rigid structure together with vertical movement of said rear wheel, a rear wheel suspension system comprising:

a pivotable-shaft actuated type damper fixedly mounted on said rigid structure in stationary relation thereto, said damper being provided with actuating means therefor;

said damper actuating means comprising a pivotable operating shaft, said damper operatively cooperating with said pivotable operating shaft so as to generate a damping force, while remaining stationary relative to said rigid structure, upon pivotal movement of said operating shaft about its own axis;

a link mechanism operatively connected between said pivotable element and said damper, said link mechanism comprising a rod connected with a pivotable link member;

said operating shaft of said damper being integrally connected with said link member so as to define a pivot shaft for said link member which pivots integrally therewith;

a coil spring tensioned between said rigid structure and said link member such that said spring, said link member and said rod are operatively connected and arranged in series; and said damper and said coil spring being mounted separately and independently of each other;

said pivotable element comprises a rear wheel supporting member pivotably secured to said rigid structure for supporting said rear wheel, and said link member is operatively connected with said rear wheel supporting member via said rod; and said coil spring being pivotably secured at one end thereof to said rear wheel supporting member through said link mechanism and being pivotably secured at the other end thereof to said rigid structure.

6. A rear suspension system according to claim 1, 2, 3, 4 or 5, wherein:

said rigid structure comprises a body frame of said motorcycle.

7. A rear suspension system according to claim 6, wherein:

said operating shaft is pivotably supported by said body frame.

8. A rear suspension system according to claim 6, wherein:

said body frame includes a seat frame member which extends rearwardly below a seat of said motorcycle; and one end of said coil spring is pivotably secured to said seat frame member.

9. A rear suspension system according to claim 8, wherein:

one end of said coil spring is pivotably secured to a forward end portion of said seat frame member.

10. A rear suspension system according to claim 8, wherein:

one end of said coil spring is pivotably secured to a rear end portion of said seat frame member.

11. In a motorcycle having a relatively stationary rigid structure, a rear wheel and a pivotable element which is pivotable with respect to said rigid structure together with vertical movement of said rear wheel, a rear wheel suspension system comprising:

a pivotable-shaft actuated type damper fixedly mounted on said rigid structure, said damper being provided with actuating means therefor;

said damper actuating means comprising a pivotable operating shaft, said damper operatively cooperating with said pivotable operating shaft so as to generate a damping force upon pivotal movement of said operating shaft;

a link mechanism operatively connected between said pivotable element and said damper, said link mechanism comprising a rod connected with a pivotable link member;

said operating shaft of said damper being integrally connected with said link member so as to define a pivot shaft for said link member which pivots integrally therewith;

a coil spring tensioned between said rigid structure and said link member such that said spring, said link member and said rod are operatively connected and arranged in series;

said damper and said coil spring being mounted separately and independently of each other; and an engine casing fixedly connected to a body frame of said motorcycle and constituting said rigid structure together with said body frame, said damper being mounted on said engine casing.

* * * * *